United States Patent
Gerdmann et al.

[11] Patent Number: 5,613,274
[45] Date of Patent: Mar. 25, 1997

[54] INSULATED HANDLE GRIP

[75] Inventors: Harold F. Gerdmann; Keith E. Mumpy, both of Manitowoc, Wis.

[73] Assignee: Newell Operating Company, Freeport, Ill.

[21] Appl. No.: 505,809

[22] Filed: Jul. 21, 1995

[51] Int. Cl.⁶ ................................................ A47B 95/02
[52] U.S. Cl. .................. 16/116 R; 16/110 A; 16/114 R; 220/755
[58] Field of Search .................................. 16/116 R, 117, 16/119, 110 A, 114 R, DIG. 12; 220/755, 759, 769

[56] References Cited

U.S. PATENT DOCUMENTS

| | | | |
|---|---|---|---|
| 1,830,383 | 11/1931 | Bos | 16/116 R |
| 1,908,834 | 5/1933 | Engberg et al. | 16/116 R |
| 2,231,830 | 2/1941 | Moore et al. | 220/755 |
| 3,815,175 | 6/1974 | Nee Borbas | 16/114 |
| 4,033,009 | 7/1977 | Hoinash | 16/114 R |
| 4,059,867 | 11/1977 | Adamis | 16/110 A |
| 4,197,611 | 4/1980 | Bell et al. | 16/116 R |

FOREIGN PATENT DOCUMENTS

| | | | |
|---|---|---|---|
| 2565810 | 12/1985 | France | 16/110 A |
| 2518954 | 8/1976 | Germany | 16/110 A |

*Primary Examiner*—Chuck Y. Mah
*Attorney, Agent, or Firm*—Baker & McKenzie

[57] ABSTRACT

A hand grip for looped metal handles of cookware which become hot during stove top or oven use which can be quickly and easily assembled to and disassembled from such cookware handles by modest hand generated forces, and which is easily washable, together with such a handgrip in combination with a cookware vessel, is disclosed.

8 Claims, 1 Drawing Sheet

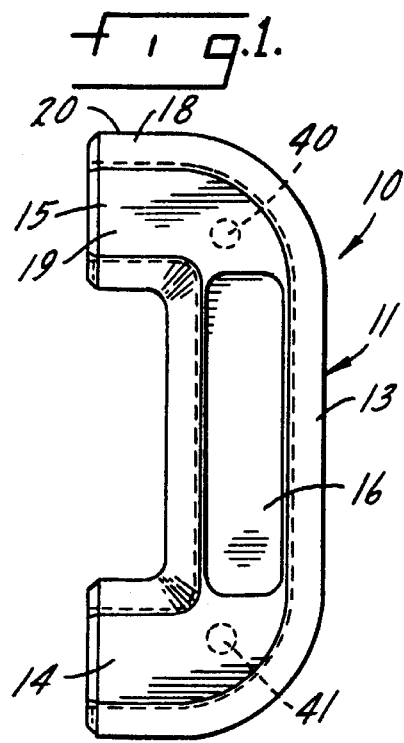
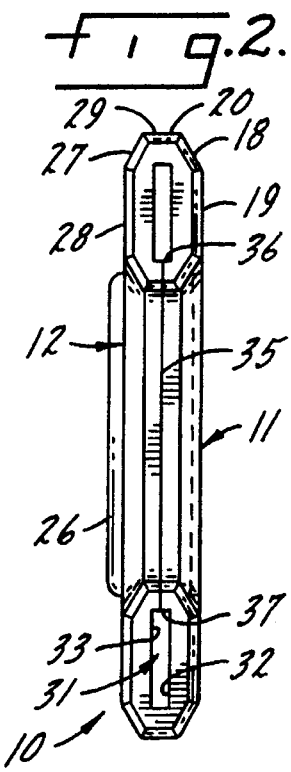
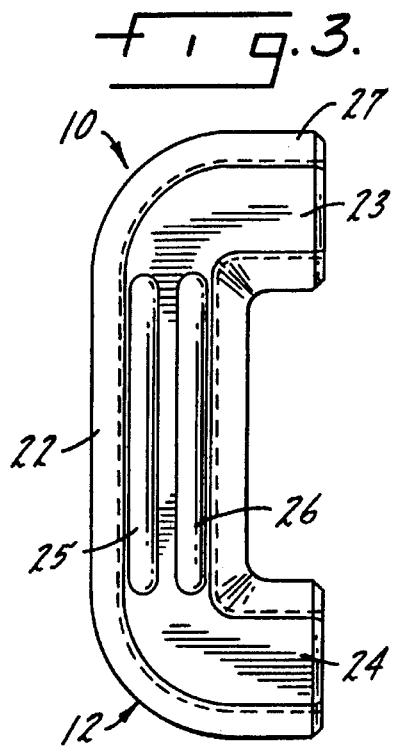
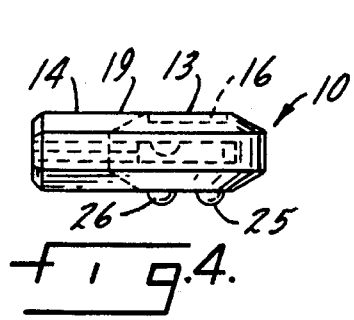
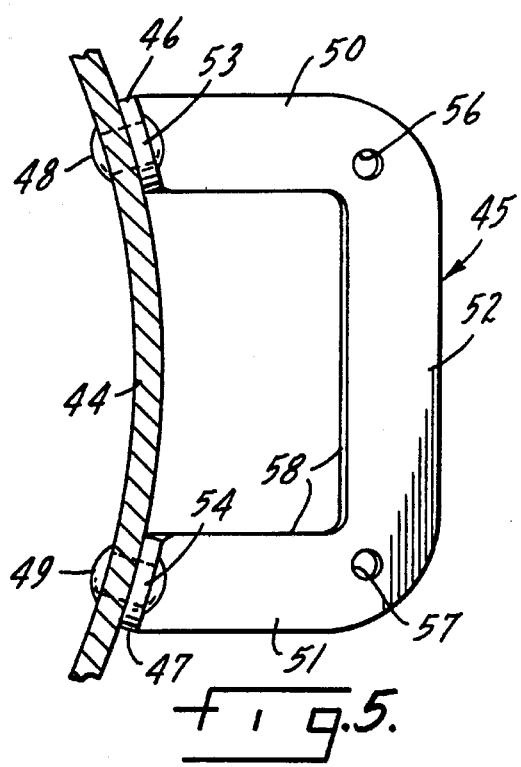
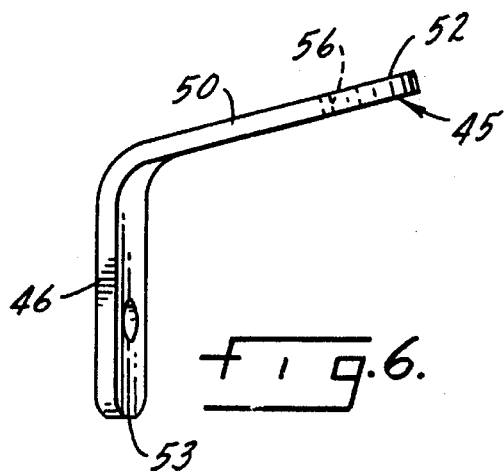

INSULATED HANDLE GRIP

This invention relates generally to insulating means for enabling a hot object to be handled by human hands and specifically to an insulated handle grip for such items as stock pots and other kitchen vessels which have a metal handle which may, during the cooking process, be exposed to heat and yet be required to be handled by kitchen personnel at high temperatures.

BACKGROUND OF THE INVENTION

Cooking vessels, such as stock pots, often have a pair of handles which project outwardly from the upper edge of the vessel at opposing locations which are intended to be grasped by a user during active use, such as after the contents of the vessel, such as corn on the cob, have been cooked over a burner. If the vessel has exposed metal handles it may only be grasped by using a pot holder or dry cloth as an insulator between the hot metal and the hands and fingers of the user. If a conventional phenolic or other hard plastic envelope is formed over the handle, the temperature of the handle assembly may be somewhat cooler to the touch than the base metal, but still too hot to be handled by the bare hand. Thus a pot holder or cloth is a necessity. One of the main difficulties with using pot holders or cloths is that the pot holder or cloth may be wet in an area which comes into contact with the bare metal and hence one or more fingers may be subjected to heated moisture which can be at a temperature too high to be comfortable to the user. And in some cases a pot holder or cloth may be worn, or torn, or burned away in an area located between the hot metal and the user's fingers, again with uncomfortable results for the user. Rubber would appear to be a viable alternative to the above described options. However, in order to use rubber as a grip insulator, it would be necessary to mold the rubber around the handle. Since a typical stock pot may have a diameter of 10", or even 12" such as an 8 quart stock pot, the molding process becomes quite complex and slow, having in mind the need to move a large bulky object into and out of engagement with rubber molding equipment, and ensure proper sealing at the rubber and metal junctions.

This problem is becoming particularly acute at the present time as metal handled cookware appears more and more frequently in the home kitchen. At an earlier time, and still today, cookware in the commercial or professional market, i.e., restaurants and food service establishments, invariably includes metal handles. This is because phenolic handles simply do not stand up to the rough usage in a commercial kitchen environment, as for example, when the vessels are tossed from a distance of several feet into a wash tub after use. The metal handles present no handling difficulty to the professional chef because such a chef always has both an apron and a fresh towel tucked into the apron string and hence one or both layers of cloth are readily at hand when it comes time to remove a hot pot from a burner.

The situation is quite different in the kitchen of the average consumer. Very few home cooks use aprons and even fewer move about the kitchen with a cloth tucked into their belt.

At the present time consumers are demanding, and cookware manufacturers are providing, commercial (often called "gourmet") style cookware for the home kitchen market with metal handles. The problem then is to provide such cookware at a price which the consumer can afford because molding a rubber handle onto the cookware is not a viable option due to the high cost. The home kitchen user also wishes to be able to clean the handles effectively, a task which is not always easy when a phenolic is formed on the metal handle; cracks and crevices in which food particles can lodge are invariably present.

There is therefore a need for a grip insulating system which utilizes rubber with its inherently good insulating qualities, but which does not require complex and expensive molding operations to associate the rubber grip with the metal handle, which permits the rubber handle to be readily removed for cleaning, and, concomitantly, which permits the rubber grip to be easily inserted and, once inserted, fixed in position so that it does not accidentally slip off in use at a critical time.

In this connection elongated rubber grippers are known for stick handles, and such elongated grippers are known to be quite effective. An example is shown in the Bett et al U.S. Pat. No. 4,197,611, a patent directed to commercial grade cookware. However, the handles of a stock pot are very short, usually less than 2 or 2-½ inches in radial length away from the periphery of the stock pot, and hence the long length available to form friction resistance between the metal stick handle and a rubber sleeve are simply not available in the short handles which are common to cookware vessels other than fry pans.

SUMMARY OF THE INVENTION

The invention is an easily assemblable and disassemblable rubber hand grip for the short metal handles of metal cookware vessels, such as stock pots, and the combination thereof, which, upon assembly, provides excellent insulation of the handle for the user, is mechanically or semi-mechanically locked in place during use, can be easily removed so that the metal handle of the cookware vessel and the rubber grip can be easily washed by the user, and is extremely inexpensive to fabricate (as contrasted to molded products) so that the cost of such cookware vessels is economical, thus making such gourmet style products available to the mass market consumer.

BRIEF DESCRIPTION OF THE DRAWING

The invention is illustrated more or less diagrammatically in the accompanying drawing in which FIG. 1 is a top plan view of the handle grip of this invention;

FIG. 2 is a left side view of the handle grip of FIG. 1;

FIG. 3 is a bottom plan view of the handle grip of FIG. 1;

FIG. 4 is front end view;

FIG. 5 is a bottom view of a typical metal handle on a cookware vessel such as a stock pot, including a section of the wall of the cookware vessel, prior to assembly of the hand grip of FIGS. 1–4 thereto; and FIG. 6 is a side view of the cookware metal handle of FIG. 5.

DETAILED DESCRIPTION

In the following description of the invention like reference numerals will be used to refer to like or similar parts from Figure to Figure.

Referring first to FIG. 1 the handle grip of this invention is indicated generally at 10 in FIG. 1. The grip consists of a top half, indicated generally at 11, and a bottom half, indicated generally at 12. The top half 11 has an elongated finger grip section 13 which terminates in two inwardly extending ends 14,15. The top half 11 may optionally have a recessed area 16 in which a trademark or other identifying indicia may appear, as by raised letters (not shown). The handle grip is preferably made of silicone rubber having a Durometer value of 70±5 and should be self-extinguishing and conform to all applicable FDA requirements. As will be apparent from FIGS. 2 and 4, the cross-sectional shape of the handle grip is generally elliptical, the upper end 15, for example, having an angled portion 18 between its flat surface 19 and outer edge surface 20.

The bottom half 12 of the grip has an elongated finger grip section 22 which terminates in two inwardly extending ends 23,24. The bottom half 12 also has a pair of raised ridges 25, 26 which function to increase the resistance to slippage between the fingers of the user and the grip. The bottom half 12, like the top half 11, has angled surface 27 between its flat surface 28, see FIG. 2, and outer edge surface 29 which is a continuation of surface 20.

The two halves 11 and 12 have mating internal recesses which define a generally U-shaped internal cavity indicated generally at 31. The cavity 31 includes first recess 32 in top half 11 and a second recess 33 in bottom half 12. The cross section shape of the recess is such as to snugly receive the shape of a cookware vessel metal handle as will be described below. The halves are defined, in effect, by a slit 35 which extends from the inside of end 15 to the inside of end 14. From FIG. 2 it will be noted that one side of the slit terminates in the inside surface 36 of the cavity in end 15, and the other side of the slit terminates in the inside surface 37 of end 14. The slit extends through the inside, or left side, of finger grip section 13 so that access is provided to the internal cavity 31 about its entire inner side. Although the slit is shown as centered on inside surfaces 36 and 37, it could be aligned with a long wall of the cavity 31.

A pair of locking dogs are shown at 40 and 41. The locking dogs are formed integrally with the handle grip and project into the internal cavity 31 from, in this instance, the top half 11 of the grip.

Referring now to FIGS. 5 and 6, a portion of the wall of a cookware vessel is indicated at 44 and a looped metal handle is indicated generally at 45. The handle 45 includes two legs 46, 47, which are secured to the wall 44 by any suitable fasteners 48, 49. The legs 46, 47 extend upwardly to a smooth junction with spacer arms 50, 51, see FIG. 6, which extend outwardly to a smooth junction with grip section 52. As can be best visualized from FIG. 6 and the ends 53, 54 of arms 46, 47, respectively, the cross section shape of the metal handle is rectangular, and of a size to be accommodated in the internal cavity 31 of the handle grip 10.

A pair of apertures 56, 57 are shown in the junction areas between the spacer arms 50, 51 and the grip section 52. From a comparison of the positions of the holes 56, 57 in the metal handle 45 with the positions of the locking dogs 40, 41 in handle grip 10, it will be appreciated that, when the handle grip 10 is assembled to the metal handle 45, the locking dogs 40, 41 will be received in the holes 56, 57. Thus, in addition to the (a) frictional resistance between the rubber of handle grip 10 and the metal of handle 45, and (b) the abutment of inside surfaces 36 and 37 against the inside edge 58, see FIG. 5, of handle 45, there will be (c) the mechanical locking action provided by the penetration of the locking dogs into holes 56, 57, all acting to resist separation of the rubber handle grip 10 from the metal handle 45. The locking dogs will provide shearing resistance to separation of the grip from the handle.

It will be understood that the slit 35 together with the long dimensions of the internal cavity ends 14 and 15 provide easy assembly of the grip 10 to handle 45 since the grip 10 is rubber and hence easily deformed by gentle hand pressure directed in a direction to push the grip 10 onto the handle 45.

It will also be noted that a substantial thickness of rubber surrounds the metal handle at every point of contact between the grip and the handle so that there is always a substantial layer of heat insulation material between the hand of the user and the hot metal handle.

The grip 10 may, of course, be left on the stock pot as it is heated on an open burner. Alternatively, the user may press a grip 10 on each of the two handles on opposite sides of the stock pot by pushing toward one another just before removal of the stock pot from the stove. In a baking context, the user will usually assemble the grip to the handles just after the oven door is opened and while the stock pot rests on a shelf in the oven. The slit 35 enables the user to quickly slip the grip over the metal handle so as to expose the hands of the user to the oven heat for only a minimum of time.

A particular advantage of the invention is that the rubber grips may be easily removed from the stock pot either before or after the stock pot is put into a sink preparatory to washing following use, and, in view of the relatively smooth internal and external contour of the grip, cleaning liquid easily reaches all surfaces on and in the grip. Thus the possibility of food particles being retained on either the handle or the grip following washing is met.

Although a specific embodiment has been illustrated and described, it will at once be apparent those skilled in the art that modifications may be made within the spirit of the invention. Accordingly it is intended that the scope of the invention be limited not by the foregoing description but solely by the scope of the hereafter appended claims when interpreted in light of the relevant prior art.

We claim:

1. In combination, a cookware vessel having a generally looped-shaped handle, said handle having an open interior, being composed of metal and having a gripping portion, said gripping portion being spaced, by spacing means, from the vessel a distance sufficient to provide access for the fingers of a user inserted through the open interior of the handle, an insulating handle grip adapted to be received on and surround the gripping portion of the handle, said handle grip having the characteristics with respect to deformability and insulating qualities of rubber, and means for mechanically restraining separation of the handle and the grip one from the other.

2. The combination of claim 1 further characterized in that the grip has an internal cavity within which the gripping portion of the handle is received, and further including means for assembling and disassembling the grip from the handle by modest hand generated forces.

3. The combination of claim 2 characterized in that the means for assembling and disassembling the grip from the handle is an opening which extends along the grip a distance sufficient to enable the gripping portion of the handle to be inserted into and removed from the grip.

4. The combination of claim 3 further characterized in that the opening in the grip which enables the grip to be assembled and disassembled from the handle is a slit.

5. The combination of claim 4 further characterized in that the grip further includes a portion at each end thereof which extends inwardly toward the cookware vessel, said end portions having a cavity therein for receiving at least the outermost portions of the spacing means of the handle.

6. The combination of claim 1 further characterized in that the mechanical restraining means includes dog means and receiving areas in the handle and the grip arranged to place the material of the handle in shearing resistance to separation of the grip from the handle.

7. An insulating handle grip for the gripping portion of a handle of a cookware vessel, which gripping portion is spaced from the adjacent cookware vessel, said grip including a cover portion consisting of wall means which define an internal cavity in which the gripping portion of a looped cookware vessel handle is to be received and surrounded, said wall means having an opening on one side which enables the wall means to be pushed onto and pulled away from the gripping portion of a cookware vessel handle to thereby enable the grip to be assembled and disassembled from the handle by modest hand generated forces, and mechanical separation restraining means projecting downwardly from a surface of the cavity toward the center of said cavity, said separation restraining means being formed integrally with said cover portion of the handle grip, said grip having the characteristics with respect to deform ability and insulating qualities of rubber.

8. The insulating handle grip of claim 6 further characterized in that the opening in the cover portion which enables the wall means to be assembled to a cookware vessel handle is on the side of the cover portion nearest the wall of the cookware vessel.

* * * * *